(12) United States Patent
Marwah et al.

(10) Patent No.: US 9,322,667 B2
(45) Date of Patent: Apr. 26, 2016

(54) DETECTING ANOMALIES IN POWER CONSUMPTION OF ELECTRICAL SYSTEMS

(75) Inventors: Manish Marwah, Palo Alto, CA (US); Gowtham Bellala, Palo Alto, CA (US); Martin Arlitt, Calgary (CA); Geoff M Lyon, Half Moon Bay, CA (US); Cullen E. Bash, Los Gatos, CA (US); Chandrakant Patel, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 843 days.

(21) Appl. No.: 13/459,143

(22) Filed: Apr. 28, 2012

(65) Prior Publication Data

US 2013/0289904 A1    Oct. 31, 2013

(51) Int. Cl.
*G01R 21/00* (2006.01)
*G01D 4/00* (2006.01)
*G01R 21/06* (2006.01)

(52) U.S. Cl.
CPC ............... *G01D 4/00* (2013.01); *Y02B 70/343* (2013.01); *Y02B 90/245* (2013.01); *Y04S 20/34* (2013.01); *Y04S 20/40* (2013.01)

(58) Field of Classification Search
CPC ............................. G01R 21/133; G01D 4/00
USPC ...................................................... 702/61–63
See application file for complete search history.

(56) References Cited

U.S. PATENT DOCUMENTS

| 7,739,082 | B2 | 6/2010 | Scherrer | |
| 2009/0030752 | A1 | 1/2009 | Senturk-Doganaksoy et al. | |
| 2010/0290346 | A1* | 11/2010 | Barford et al. | 370/242 |
| 2010/0299118 | A1* | 11/2010 | Sharma et al. | 703/2 |

FOREIGN PATENT DOCUMENTS

WO    2011057339 A1    5/2011

OTHER PUBLICATIONS

D'Haeseleer, Patrik et al., An Immunological Approach to Change Detection: Algorithms, Analysis and Implications, 1996 IEEE Symposium on Security and Privacy, 10 pgs.
Joshi, Mahesh et al., Mining Needles in a Haystack: Classifying Rare Classes via Two-Phase Rule Induction, ACM SIGMOD 2001, May 21-24, Santa Barbara, California, 12 pgs.
Fujimaki, Ryohei et al., An Approach to Spacecraft Anomaly Detection Problem Using Kernel Feature Space, KDD '05, Aug. 21-24, 2005, Chicago, IL, 10 pgs.
Bakar, Zuriana Abu et al., A Comparative Study for Outlier Detection Techniques in Data Mining, IEEE, 2006, 6 pgs.
Steinwart, Ingo et al., A Classification Framework for Anomaly Detection, Journal of Machine Learning Research 6 (2005) pp. 211-232, submitted Nov. 2004, published Mar. 2005.

(Continued)

*Primary Examiner* — Phuong Huynh
(74) *Attorney, Agent, or Firm* — Dickinson Wright

(57) ABSTRACT

A method for detecting power consumption anomalies. The method obtains two different time power series and compares them to generate a dissimilarity matrix. A dimensionality reduction equation is applied to the dissimilarity matrix to obtain a low dimensional embedding of the power data. A probability score of each of the time series being anomalous is then calculated.

14 Claims, 5 Drawing Sheets

(56) References Cited

OTHER PUBLICATIONS

Phua, Clifton et al., Minority Report in Fraud Detection: Classification of Skewed Data, Sigkdd Explorations, vol. 6, Issue 1, pp. 50-59, School of Business Systems, Faculty of Information Technology, Monash University, Clayton Campus, Wellington Road, Clayton, Victoria 3800 Australia.

Joshi, Mahesh et al., Predicting Rare Classes: Can Boosting Make Any Weak Learner Strong? SIGKDD '02 Edmonton, Alberta, Canada, pp. 297-306.

Dasgupta, Dipankar et al., Anomaly Detection in Multidimensional Data Using Negative Selection Algorithm, IEEE, 2002, pp. 1039-1044.

Dasgupta, Dipankar et al., A Comparison of Negative and Positive Selection Algorithms in Novel Pattern Detection, IEEE, 2000, pp. 125-130.

Chawla, Nitesh et al., Editorial: Special Issue on Learning from Imbalanced Data Sets, Sigkdd Explorations, vol. 6, Issue 1—pp. 1-6.

Chandola, Varun et al., Anomaly Detection: A Survey, ACM Computing Surveys, Sep. 2009, pp. 1-72.

http://en.wikipedia.org/wiki/Fast_Fourier_transform, Frequency spectrum computation via Fast Fourier transform, Apr. 28, 2012, 10 pgs.

http://en.wikipedia.org/wiki/Euclidean_distance, Euclidean distance, Apr. 28, 2012, 3 pgs.

http://en.wikipedia.org/wiki/Taxicab_geometry, Taxicab geometry, Apr. 28, 2012, 3 pgs.

http://en.wikipedia.org/wiki/Lp_space, Lp space, Apr. 28, 2012, 14 pgs.

http://en.wikipedia.org/wiki/Multidimensional_scaling, Multidimensional scaling, Apr. 28, 2012, 5 pgs.

http://en.wikipedia.org/wiki/Spectral_clustering, Spectral clustering, Apr. 28, 2012, 3 pgs.

http://en.wikipedia.org/wiki/Isomap, Isomap, Apr. 28, 2012, 2 pgs.

Barnett, Vic et al, Outliers in Statistical Data, 3rd Edition, Mar. 1994, http://www.wiley.com/WileyCDA/WileyTitle/productCd-0471930946.html.

Hawkins, D., Identification of Outliers (Monographs on Statistics & Applied Probability), 1st Edition, Jul. 31, 1980, http://www.amazon.com/Identification-Outliers-Monographs-Statistics-Probability/dp/041221900X.

Abe, Naoki et al., "Outlier Detection by Active Learning", Retreived Oct. 27, 2015, 8 pgs.

\* cited by examiner

DETECTING ANOMALIES IN POWER CONSUMPTION OF ELECTRICAL SYSTEMS

BACKGROUND

Electrical systems for various equipment and buildings, particularly commercial and industrial electrical systems use large quantities of electrical power. For example, commercial buildings use a significant amount of energy as part of their day-to-day operations. It is estimated that commercial buildings in the United States alone consumed an estimated 37% of the total electricity generated in the United States. The electricity cost for a building operator or tenant of a building is one of the largest costs associated with the building. The two primary uses of electricity in commercial buildings are generally related to lighting and climate control or HVAC.

To reduce energy consumption and avoid unnecessary expense, operators of electrical systems attempt to be more energy efficient. For example, building managers employ a variety of methods and devices to estimate building occupancy, such as timers and motion detectors, and therefore reduce energy use. To avoid turning off or reducing services while the building is occupied, timers are typically configured to reduce lighting and climate control well before or well after a building is occupied, which minimizes their effectiveness at reducing energy consumption on a day-to-day basis. In addition, timers are incapable of adjusting for floating holidays or other periods of abnormal low building occupancy, unless specifically programmed by the operator. Motion detectors solve many of the problems associated with timers, but are very expensive to install throughout a building and interconnect with a controller, particularly in existing buildings. However, none of these models identify anomalies in the energy consumption of the building, especially real time identification of anomalies.

Many utilities are installing smart meters in electrical systems to measure power attributes, such as voltage, current, power, or any other desirable characteristic. While all of these meters may record real time energy usage, it is very difficult for an operator to inspect all of the power related data that is collected, particularly in real time or as close to real time as possible to detect anomalies in power consumption. Typically, it is labor-intensive and therefore an expensive procedure for an electrical system operator, such as a building administrator, to meticulously go through the vast amount of power data. Thus, many equipment anomalies and changes in usage patterns that affect the power consumption of a device or appliance but do not negatively affect the performance remain undetected. While computers are well suited to handle volumes of data that a building administrator cannot, there are still challenges. The first challenge is the lack of labeled data to train an algorithm for detecting anomalous behavior. Obtaining labeled data is an expensive procedure as it usually requires extensive human interaction.

DETAILED DESCRIPTION

Figure 1:
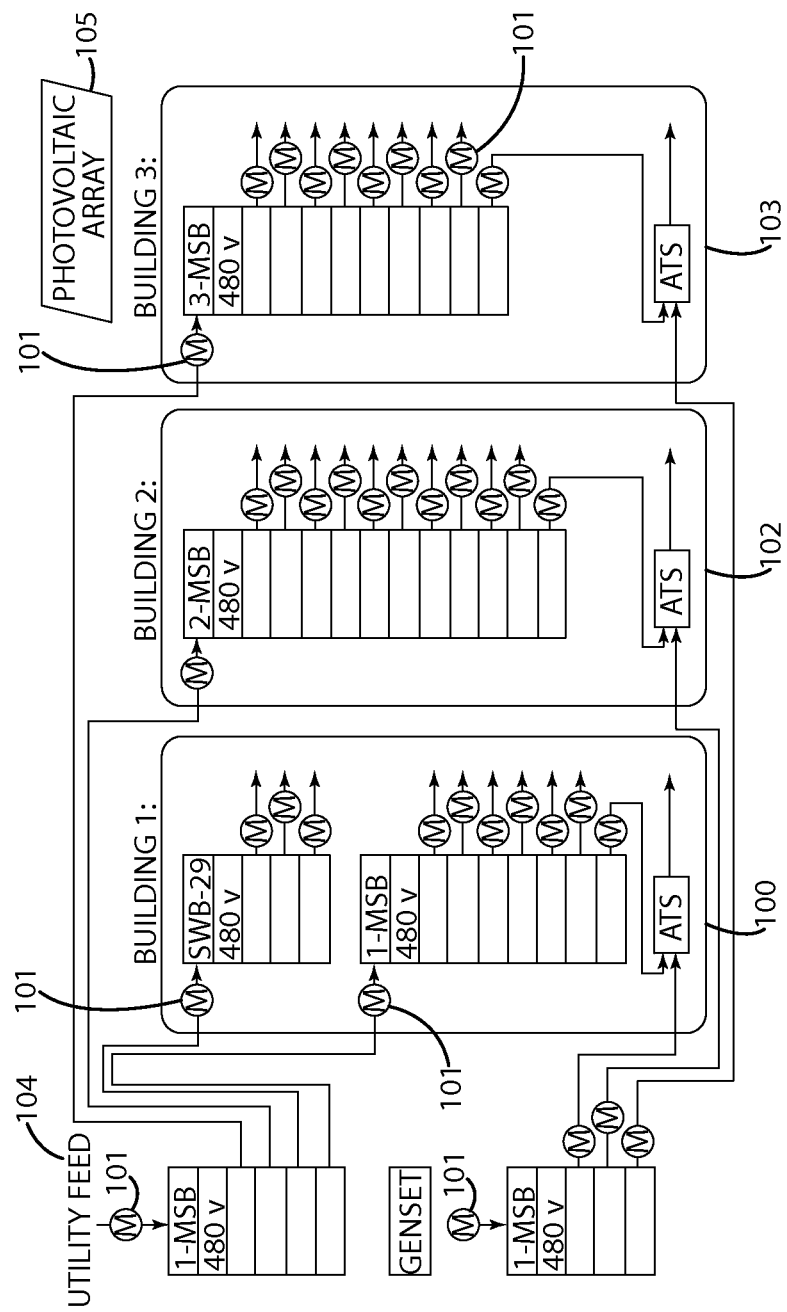
FIG. 1 illustrates a power distribution and metering topology used in the examples.

To reduce energy consumption, the method described and illustrated below reduces anomalies in power consumption of electrical systems. As further detailed below, and illustrated in the figures, the method is generally discussed relative to an example where the method was applied to detect power anomalies for buildings on a commercial campus, although the method is applicable to any electrical system to detect anomalies in the power consumption of that electrical system. Anomalies may occur from failure of equipment, from faulty operation of a building, as well as other factors. The method uses an unsupervised technique that identifies anomalous usage periods in power consumption time series data. More specifically, in the method the power time curves of individual meters are clustered and the anomalous results lie outside of the clusters. The method treats the power consumption data over a specified time period (such as a 24 hour interval) as a single observation. This time resolution may be specified by the building operator. The power consumption data collected over several days would then correspond to multiple observations. The method compares the power usage behavior between any two observations by computing a dissimilarity measure. The dissimilarity measure used in the standard Euclidean distance, which can be computer either in the time domain or in the frequency domain. In the latter case, the frequency spectrum of an observation is computed using a Fast Fourier transform. A dissimilarity matrix is then generated by computing the dissimilarity values for every pair of observations. Next a dimensionality reduction algorithm is used to obtain a low dimensional Euclidean embedding of the observations. These low dimensional observations are used to compute the probability score of each observation being anomalous. The method may be implemented in an on-line real-time anomaly detection system.

The method of detecting power consumption anomalies in an electrical system includes monitoring at least one power meter disposed between a power source, such as an electrical grid, generator, solar array or any other source of electricity, and the electrical system which interconnects various items and equipment requiring electrical power; determining a first power time series having a first time period from monitoring, determining a second power time series having a second time period from monitoring. The first and second time periods are different and the first power time series is compared with the second power time series to generate a dissimilarity matrix. A dimensionality reduction algorithm is then used to obtain a low dimensional embedding of the dissimilarity matrix. A probability score of each of the first and second power time series being anomalous is calculated.

These principles are discussed herein with respect to example processes, methods, system, and apparatus, and with reference to various diagrams. The examples are shown and described as a series of blocks, but are not limited by this depiction, as the actions, steps, concepts, and principles associated with the illustrated blocks may occur in different orders than as described, and/or concurrently, and fewer or more than the illustrated number of blocks may be used to implement an example method. Blocks may be combined or include multiple components or steps.

The functional units described herein as steps, methods, processes, systems, subsystems, routines, modules, and so forth, may be implemented by a processor or processors executing software. Executable code may include physical and/or logical blocks of computer instructions that may be organized as a procedure, function, and so forth. The executables associated with an identified process or method need not be physically collocated, but may include disparate instructions stored in different locations which, when joined together, collectively perform the method and/or achieve the purpose thereof. Executable code may be a single instruction or many, may be distributed across several different code segments, among different programs, across several memory devices, and so forth. Methods may be implemented on a computer, with the term "computer" referring herein to a computer or computers and/or a computer network, or otherwise in hardware, a combination of hardware and software, and so forth.

Anomaly detection is useful in understanding and managing power consumption. Anomaly detection is used to detect any abnormal behavior in the power usage time series. An anomaly indicates an irregular usage pattern and may not always correspond to a component failure or faulty operation. Anomalies generally include irregular power usage resulting in high power consumption. Any type of electrical system or size of electrical system may be monitored and may vary from the electrical system for a single piece of equipment, a plurality of equipment, a building, multiple buildings, city blocks, neighborhoods and even electrical grids. The method solves at least two difficulties in performing anomaly detection. First, power data typically has high dimensionality, specifically there are now huge amounts of data available from power meters. For example, if only the power consumption data is collected every 10 seconds, the resulting data set from a single meter would be 8,640 samples per meter per day. In the three buildings illustrated in the example in FIG. 1 with 39 meters, the amount of data available makes it difficult to manually review and detect any anomalies. Second, there is typically a lack of labeled data associated with meters. For large scale campuses having many buildings, each including multiple meters, it may be difficult to label the individual data sets. The lack of labeled data makes it difficult and expensive to train an algorithm for detecting anomalous behavior. The method uses a novel cluster-based unsupervised approach that detects anomalous points via a low-dimensional embedding of the power data, without the difficulties described above.

The method allows the input of the power time series observed by a meter over multiple days, and outputs the probability of the power consumption behavior being anomalous for desired time periods, each having similar time intervals, such as determining anomalous behavior for individual days. These probability scores can then be used to generate a ranked list of the data in the decreasing order of the data point being anomalous. This ranked list is useful to a building administrator in prioritizing the data points that need further inspection.

The method described below is described with reference to an actual example where the method was applied, and is in no way limited to the provided example. In the example, as discussed in greater detail below, and as illustrated in FIG. 1, a power distribution and metering topology for the three buildings 100, 102, and 103 was monitored to test the method in detecting anomalies. These three buildings 100, 102, and 103 used in the examples housed a commercial IT infrastructure, although as stated above, the method could be applied to any type of electrical system. Power usage and other related power data from these buildings will be used in the examples and other FIGS. The power distribution and metering illustrated in FIG. 1 is an example of the implementation described in the examples of where the data was acquired and any desired configuration or design where the power data is available to be used in the method as described in more detail below may be used.

Each of the illustrated buildings 100, 102, and 103 included multiple meters of which only a sample are labeled as 101, however the others may be easily identified as the "M" within a circle and any reference to power meters 101 may refer to a single meter, or any selection of the meters illustrated in FIG. 1. The method allows for any meter configuration including a single meter, multiple meters, or multiple buildings on a single meter. The illustrated buildings 100, 102, and 103 in FIG. 1 have 39 individual power meters 101. The power meters 101 illustrated in FIG. 1 were already installed at different locations in the buildings 100, 102, and 103 to monitor power consumption and allow the utilities to bill for actual used power. The loads on these meters 101 used in the examples varied from small loads such as overhead lighting on one meter to large loads such as power consumption at an entire building level. During testing of the method, the meters in the examples were not individually labeled, and when any meters were identified by the method as having anomalous readings, those meters were then manually labeled to further analyze the anomalous data points in the power data. The method was then further validated by comparing the results obtained to the actual power data.

The meters 101 used in examples for testing and validating the method were readily available commercial devices. The meters allowed a set of parameters to be measured from each meter every ten seconds using the MODBUS over Ethernet protocol. Of course, depending upon the desired measurements or other parameters, the set measurement time period may vary, and the methods of communication and tracking may also vary. The meters 101 used to obtain the data provided in the examples and in the power usage data in FIG. 2, were capable of measuring line voltage, real and apparent power, power factor, current and frequency. The method may maintain a historical log of power related data by any known method. Any type of meter that directly or through the use of other devices allows power usage to be read and input into the method in specified time increments may be used.

The buildings 100, 102, and 103 are illustrated as being fed by a single utility feed 104, although other configurations may be used. FIG. 1 also illustrates an emergency back-up generator that may not exist in other settings. Building three, 103, in the example had a 135 kW photovoltaic array 105 to offset power demand during daylight hours, which may or may not exist in other settings.

The method below is described as the power data being measured by a single meter, illustrated as 101 in FIG. 1, over a 24 hour period (i.e., one single day) as one observation or as a single power-time curve. Of course, any other desired time period may be substituted. As mentioned above, due to a lack of labeled data, the method uses an unsupervised approach where the power-time curves of each meter are clustered. The clustering of data points allows normal behavior to be easily determined and anomalies easily detected. More specifically, all of the data points that exhibit normal behavior form a tight cluster and all those points that lie outside this cluster are highly likely to correspond to an anomalous behavior.

Figure 2:
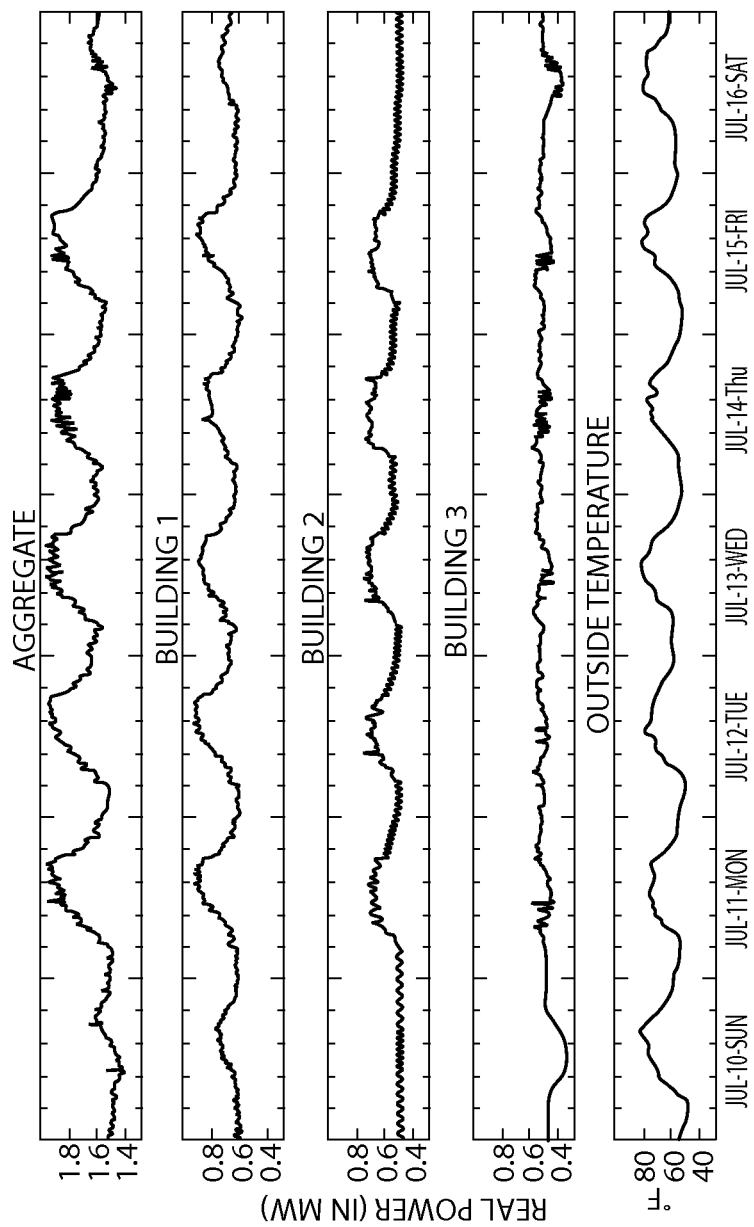
FIG. 2 illustrates a comparison of power use and outside temperature over time for three individual metered buildings in FIG. 1.

FIG. 2 illustrates the power use and the outside temperature over a time span of six days as actually measured. The significant base load seen in the buildings, even during periods of low activity, causes disaggregation techniques to not work well in determining anomalies. As such, the power demand in the buildings 100, 102, 103 has both a constant (base) and variable load components. The base load is quite significant, at about 1.5 MW, which is partially caused by the IT infrastructure within the buildings. The variable components add up to about 0.5 MW of demand and show a distinct time of day pattern. Power demand is lowest during the night and early morning, and highest during the late morning and afternoon. FIG. 2 also shows a pronounced day of week behavior, with weekends (and non-work days in general) being primarily the base load, and work days having the noticeable variable load.

In FIG. 2, the top graph shows the aggregate power consumption of the three buildings, while the middle three graphs in FIG. 2 show the total power demand for each of Buildings 1 (100), 2 (102) and 3 (103), respectively. Building 1 (100) in the example has a base load of about 0.6 MW, and a peak load of nearly 0.9 MW, while Building 2 (102) has a base load of approximately 0.5 MW, and a peak load up to 0.7 MW. Building 2 (102) has essentially no variable load on non-work days. However, there were two large spikes (almost 100 kW) on Sunday. This sort of behavior seems anomalous and will be discussed in more detail below. Building 3 (103) has a base load of almost 0.5 MW and unlike Buildings 1 (100) and 2 (102), Building 3's (103) variable load is negative, which is due to the presence of a 135 kW photo-voltaic array installed on that building. The bottom graph in FIG. 2 shows the outside temperature. As illustrated in FIG. 2, there is a correlation between outside temperature and power consumption. In addition, flat consumption on a weekend for the buildings in the examples was not anomalous.

Figure 3:
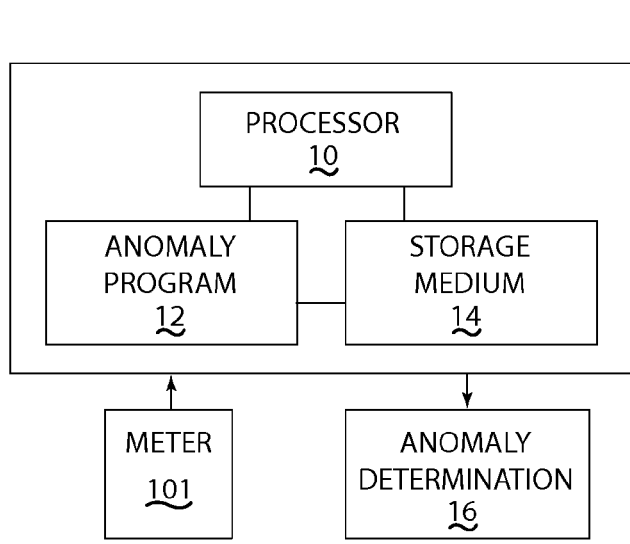
FIG. 3 illustrates a system to detect anomalies in electrical systems.
Figure 4:
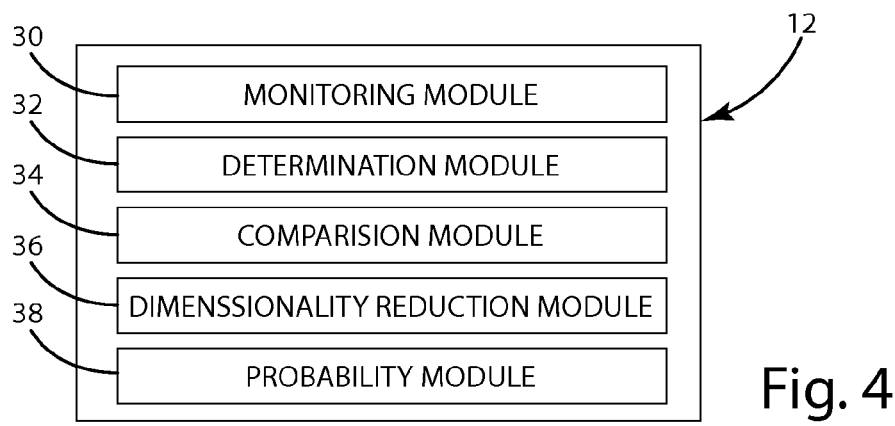
FIG. 4 illustrates a block diagram of an example of modules used to detect anomalies in electrical systems.

FIG. 3 illustrates a system having a processor 10, an anomaly detection program 12 having instructions stored on a computer readable storage medium 14 to detect anomalies in the power consumption of an electrical system, such as any electrical system feeding power to a building, multiple buildings or any equipment or electrical devices attached to a meter. The processor 10 is in communication with power meters 101, or any device capable of reading power usage of the meter and providing the data directly or indirectly to the processor. The processor then outputs an anomaly determination 16. FIG. 4 illustrates a block diagram of the anomaly detection program 12. As shown in FIG. 4, the anomaly detection program includes a monitoring module 30, a determination module 32, a comparison module 34, a dimensionality reduction module 36, and a probability module 38.

In order to compare two power-time curves, the method quantifies the dissimilarity between two observations. The method uses standard Euclidean distance measure or the $l_2$ distance between the frequency spectrums of two power-time curves as a measure of dissimilarity. The frequency spectrum generally includes two components—magnitude and phase. The method is restricted to the magnitude of the frequency spectrum to simplify the method, and the magnitude of the frequency spectrum contains all the information needed regarding the power consumption behavior.

Figure 5:
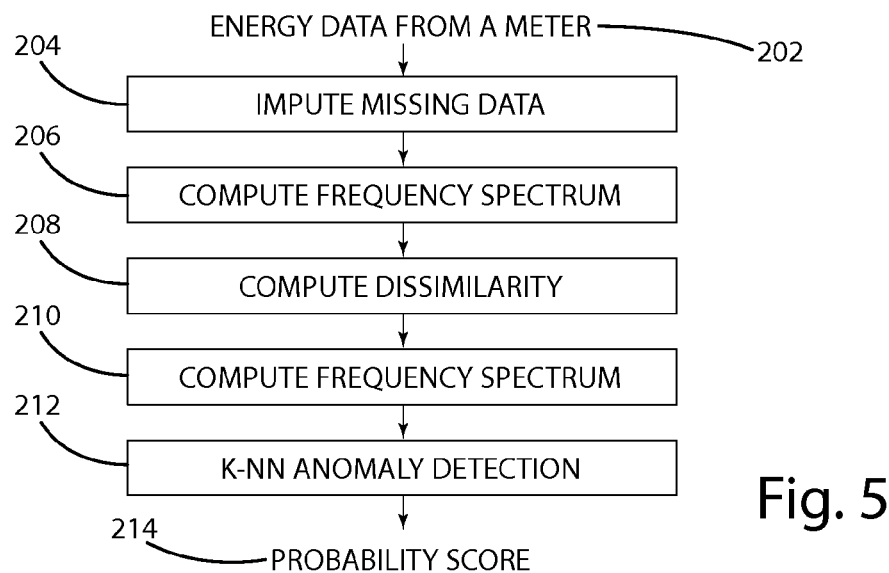
FIG. 5 illustrates a flowchart of the method of anomaly detection.

FIG. 5 generally shows the method, with the first block 202 being obtaining energy data from a meter and inputting it into the method. The second block 204 is to impute any missing data. The third block 206 is to compute the frequency spectrum. The fourth block 208 is to compute any dissimilarity. The fifth block 210 is to low dimensionally embed the data. The sixth block 212 is to perform k-NN anomaly detection. The method then outputs a probability score 214.

In regards to the step of missing value imputation 204, a power-time curve may have some missing values that could have been caused either due to a hardware or a software failure. Treating these missing values as zeros will lead to unnecessarily high frequencies in the frequency spectrum. In order to avoid this, the method imputes the missing values in block 204. The imputation strategies may include imputing with a mean or a median value, imputation using a local or a weighted global average, imputation using expectation maximization, and nearest neighbor imputation. Preferably the method uses a weighted global average strategy to impute blocks of missing values, while preserving the local structure. More specifically, let x[n], n=1, ..., N, denote a power-time curve where N denotes the number of time samples. For any time index 1≤m≤N with x[m] missing, its value is imputed using a weighted global average as given by:

$$x[m] = \frac{\sum_{k=1}^{N} w[k]x[k]}{\sum_{k=1}^{N} w[k]}$$

where the weights w[k] are chosen such that they decrease as a function of their distance from the missing value. For example, the weight function can be chosen to be:

$$w[k] = \frac{1}{|m-k|^2}.$$

This imputation strategy can be considered to be a temporal smoothing technique. In the data obtained, less than 3% of the values were missing.

Next, in block 206 computing the frequency spectrum of the power-time curve is performed after imputing the missing values in block 204. Given a sequence x[n] for n=1, ..., N, its frequency spectrum can be computed as:

$$X[k] = \sum_{n=1}^{N} x[n] * \exp\left(-j\frac{2\pi(k-1)(n-1)}{N}\right),$$

for all 1≤k≤N.

As noted above, the frequency spectrum is comprised of two components, magnitude and phase. The method considers the magnitude of the frequency spectrum as it contains all the information regarding the total power consumption. The magnitude of the frequency spectrum is denoted by Y[k], where Y[k]=|X[k]|, for k=1, ..., N.

In the next block 208, the dissimilarity matrix is computed or determined. In this step, M denotes the total number of power-time curves being analyzed. In addition, let $Y_1[k]$, $Y_2[k], \ldots, Y_M[k]$ denote their respective frequency spectrum magnitudes. Then, for any two sequences, the distance or dissimilarity between them is computed using the standard Euclidean distance measure given by:

$$\delta_{ij} = \left[\sum_{k=1}^{N} (Y_i[k] - Y_j[k])^2\right]^{\frac{1}{2}},$$

where the dissimilarity or the distance matrix $\Delta$ is obtained by computing the above distance measure for all pairs of sequences. The above distance measure is commonly referred to as $l_2$ distance. Alternatively, one could substitute the above $l_2$ distance with other distance measures such as $l_1$, $l_p$, or $l_\infty$. However, it was observed through experimental analysis that $l_2$ distance performs better than both $l_1$ and $l_\infty$. Also, note that by property of dissimilarity function, the resulting dissimilarity matrix $\Delta$ should be symmetric, i.e., $\Delta = \Delta^T$.

In the fourth step, 210, low dimension embedding is performed. Given the M×M dissimilarity matrix $\Delta$, the method uses a Euclidean embedding algorithm (also referred to as a dimensionality reduction algorithm) to obtain a low-dimensional Euclidean embedding of the M observations in a d dimensional Euclidean space (i.e., $\Re^d$), where d is usually chosen to be much smaller than the original dimension N. In FIG. 6 a low-dimensional embedding of 33 power-time curves where d=2 is presented.

A Euclidean embedding algorithm finds a set of M points in $\Re^d$ such that points that are close in the original dimension are also close in the reduced dimensions, and vice versa. Examples of standard Euclidean embedding algorithms include Multi-dimensional scaling (MDS) and Laplacian Eigenmaps.

With the low dimensional embedding performed, the last step 212 is to compute the probability score of each observation being anomalous. These values are computed through a k-NN (nearest neighbor) density estimation equation. Note that a low-dimensional embedding of the power data is crucial for this step, as density estimation is known to perform poorly in a high dimensional space due to the curse of dimensionality.

For every point $y \in \Re^d$ in the low dimensional space, the local density at that point can be estimated as $\hat{f}(y) = k/$(Volume of smallest hyper-sphere containing $k$ NNs of $y$), where k is chosen roughly to be $O(M^{1/d})$, i.e., proportional to $M^{1/d}$. Given the local densities at each of the M observations, the probability of an observation being an anomaly is computed as $$Pr(y_i \text{ is anomalous}) = 1 - \left[\hat{f}(y_i) \bigg/ \max_{j=1,\ldots,M} \hat{f}(y_j)\right].$$

Intuitively, observations that are in a high density region are less likely to be anomalous and those in low density regions are more likely to be anomalous, which is captured by the above expression.

The above described method was performed on the buildings shown in FIG. 1, with the results of the method specifically illustrated in FIG. 2 and Table 1(a). As mentioned earlier, the proposed algorithm outputs a probability score for each data point being anomalous. These probability scores can be used to obtain a ranked list of the given data points, where the data points that are ranked in the top are more likely to be anomalous, and the ones in the bottom of the ranked list are less likely to be anomalous. Table 1(a) below demonstrates a sample ranked list. Such a ranked list helps a building administrator prioritize the data points to be inspected for potential anomalous behavior.

TABLE 1(a)

| Data Point | Score |
| --- | --- |
| Jul 6 | 0.99 |
| Jul 7 | 0.97 |
| Jun 28 | 0.80 |
| Jun 20 | 0.75 |
| Jul 8 | 0.64 |

The quality of the obtained ranked list determines the quality of the proposed anomaly detection algorithm. The quality of the obtained ranked list is measured using the Area under the ROC (receiver operating characteristic) curve (or AUC) as the performance measure, which is described in more detail below.

Given a ranked list, an electrical system operator or administrator could choose a threshold t and declare the top t data points as anomalies for further inspection, and the remaining as normal. The value of t could vary from 0 to the maximum number of points in the input data. Each choice of t results in a certain number of false positives and false negatives. For example, when t=0, i.e., when all the points are declared as normal, the false positive rate (FPR) is 0 while the false negative rate (FNR) will be 1. On the other hand, when the threshold t is assigned the value equal to the total number of data points, the associated FPR is 1 and FNR is 0. Varying this threshold t results in different values of FPR and FNR, leading to a receiver operating characteristic (ROC) curve. The area under the ROC curve (AUC) defines the quality of the obtained ranking. In the ideal case, where all the anomalous points are ranked at the top followed by normal points, the AUC takes the maximum value of 1. On the other hand, a random ranking achieves an AUC value of 0.5. The AUC is used as a performance metric for the equation. Table 1(b) below shows the AUC values for the ranked list obtained using the proposed algorithm on the three meters. These values verify the accuracy of the algorithm in detecting anomalies.

TABLE 1(b)

| | AUC |
| --- | --- |
| Meter 1 | 0.87 |
| Meter 2 | 0.96 |
| Meter 3 | 0.99 |

Furthermore, the present invention characterizes all the anomalies detected in all the 39 meters by assigning them categories, as shown in Table 1(c) below. Note that a particular anomaly could belong to multiple categories.

TABLE 1(c)

| | Anomaly Category | Number of anomalies |
| --- | --- | --- |
| 1 | Abnormal high power usage | 17 |
| 2 | Abnormal low power usage | 8 |

TABLE 1(c)-continued

| | Anomaly Category | Number of anomalies |
|---|---|---|
| 3 | Irregular shutdown | 4 |
| 4 | Irregular (time) usage | 6 |
| 5 | Abnormal oscillatory behavior | 8 |
| 6 | Abnormal drop/rise | 13 |

Some of these categories provide an opportunity for potential energy savings, while others may indicate device malfunction or failures. In FIG. 6, four of the above six anomaly categories are further plotted as (a), (b), (c), and (d) using the method, and are hereinafter referred to as FIG. 6(a), FIG. 6(b), FIG. 6(c) and FIG. 6(d).

The scatter plots in FIG. 6 correspond to the low-dimensional embedding of the power data of a given power meter over six weeks. Each data point in this scatter plot denotes the power data on one day. The distance between these points signify how similar/dissimilar the power profiles are on these days.

Figure 6A:
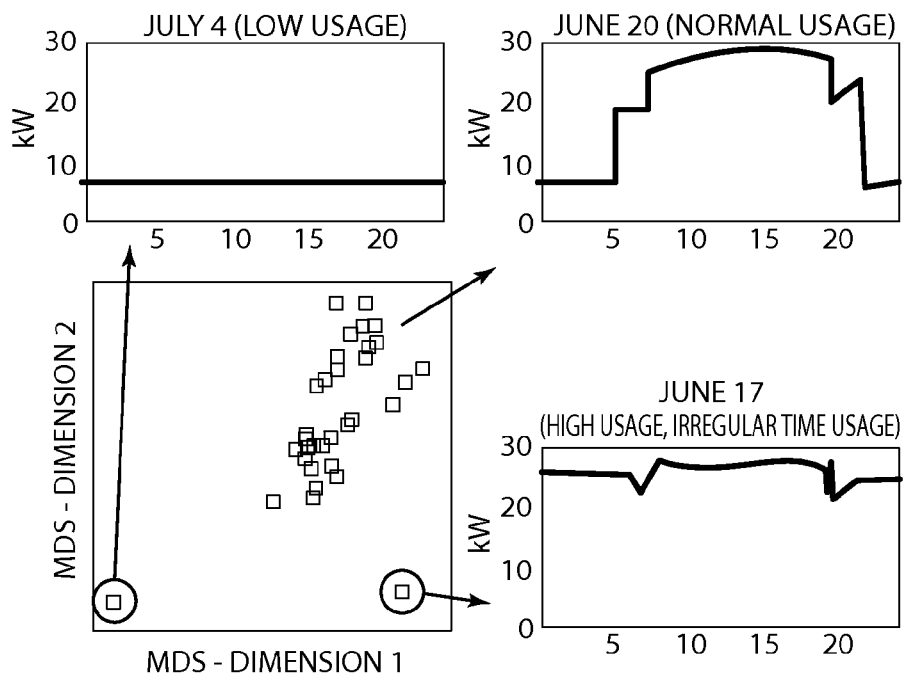
FIG. 6A illustrates a low dimensional embedding of an actual power profile on select weekdays for a first meter on a building, including a normal power profile, a high profile and a low profile and the plotted output of the method.

FIG. 6(a) corresponds to a meter whose load is primarily overhead lighting on a floor of the commercial building. The low-dimensional embedding obtained using MDS shows a tight cluster of days with normal behavior. Two points lying outside this cluster were detected as anomalous. The first has an abnormal low power usage (Category 2 in Table 1(c)), and this was July 4th, a holiday. The second anomaly belongs to categories 1 and 4, where the lights remained on all through the night. This is an example of a potential anomaly (e.g., caused by an error in the light control system) that if fixed could reduce electricity usage and save money for the building's operator.

Figure 6B:
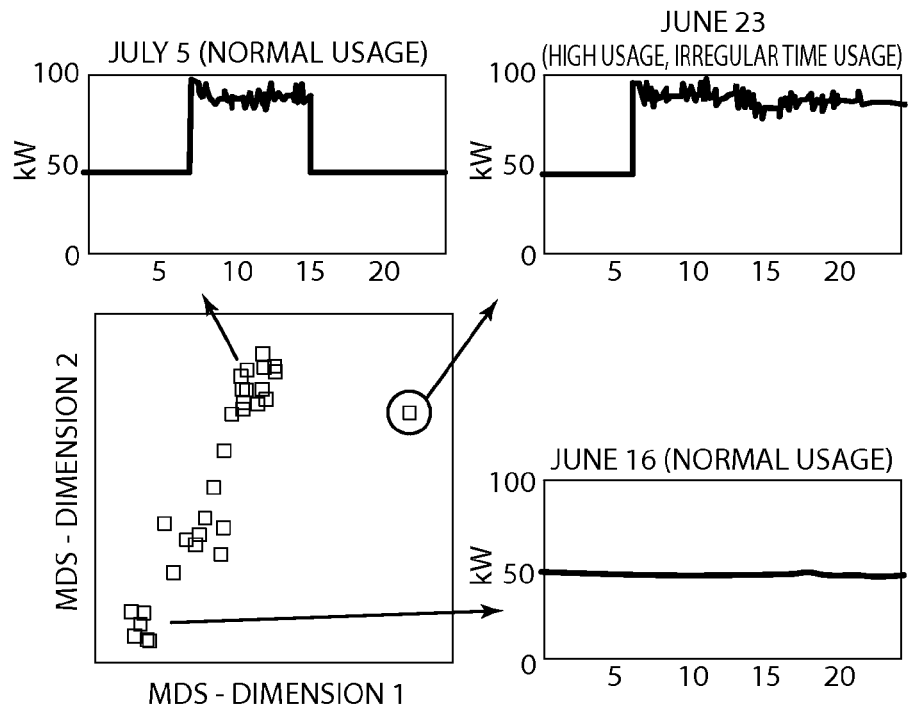
FIG. 6B illustrates a low dimensional embedding of an actual power profile on select weekdays for a second meter on a building, including a normal power profile, a high profile and a low profile and the plotted output of the method.
Figure 6C:
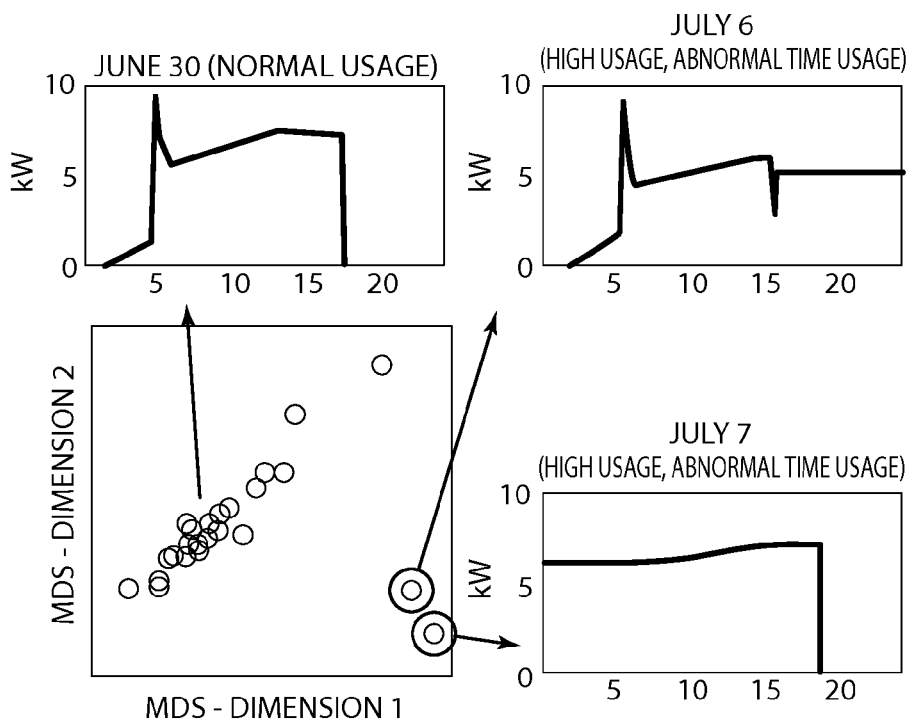
FIG. 6C illustrates a low dimensional embedding of an actual power profile on select weekdays for a third meter on a building, including a normal power profile, a high profile and a low profile and the plotted output of the method.

FIG. 6(b) demonstrates another anomalous event, where on June 23 the air handlers in the building were operating at full capacity all through the night. This is again a potential anomaly that if fixed could reduce electricity usage. Similarly, FIG. 6(c) demonstrates a third event on July 6, where the fans in a building were operating all through the night.

Figure 6D:
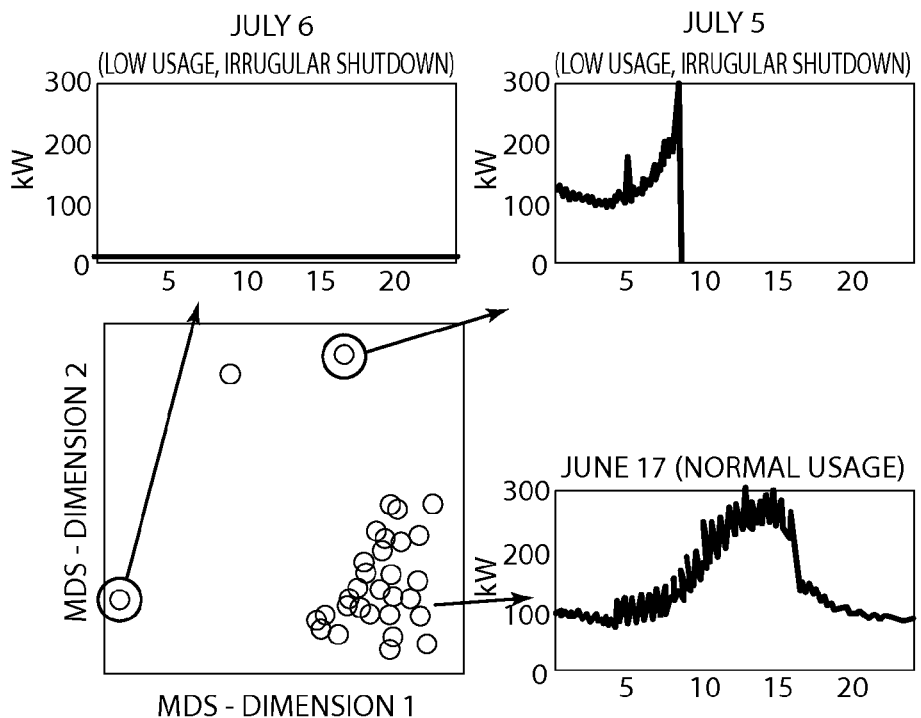
FIG. 6D illustrates a low dimensional embedding of an actual power profile on select weekdays for a fourth meter on a building, including a normal power profile, a high profile and a low profile and the plotted output of the method.

Finally, the example shown in FIG. 6(d) corresponds to a meter whose load is a chiller. Here, the method detected three anomalous points corresponding to three consecutive days where the chiller was abnormally shut down (Category 3 in Table 1(c)) during business hours. If this was not caused due to a regular maintenance schedule, it could potentially correspond to a failed component. These experiments verify the potential of the proposed anomaly detection algorithm in identifying any abnormal behavior that could have been caused due to system malfunction or device breakdown. Therefore, the method has broader applicability than just building power consumption, as described in the examples. The method therefore provides an autonomous monitoring of various items for abnormal failure of components in buildings that are not commonly monitored.

In summary, the method is able to detect anomalous behavior in power time series data, specifically, to identify irregular usage patterns that may indicate energy saving opportunities or equipment failure. This allows an unsupervised cluster-based method to detect anomalous data points via a low dimensional embedding of the power data. It takes power consumption time series at a meter as input, and outputs the probability of a particular day being anomalous. Therefore, while the time periods monitored are different, the over time interval durations may be identical, such as an hour, a day or a week. In addition, to identify any anomalies, the method may use similar measurement periods, such as the time interval being a twelve hour period starting at 6:00 am each day. Any power time series may be compared with another power time series, however to identify anomalies the actual time periods would be different, but of a similar nature, such as the time intervals used being the same, for example two full days starting at the same time. The probability scores can be used to rank the days in terms of anomalousness, providing a building administrator with a prioritized list of data points that require further inspection.

The computer-readable storage medium illustrated in FIG. 3 has machine readable instructions that when executed by a processor cause the processor to monitor at least one power meter electrically connected to the building. A first power time series having a first time period, and a second power time series having a second time period, each having different time periods, but similar time intervals are then determined. The processor compares the first power time series with the second power time to generate a dissimilarity matrix. A dimensionality reduction algorithm is applied to the dissimilarity matrix to obtain a low dimensional embedding of the dissimilarity matrix. The processor then determines a probability score of each of the first and second power time series being anomalous.

We claim:

1. A method of detecting power consumption anomalies in an electrical system comprising:
   determining a power time series from monitoring at least one power meter electrically connected to the electrical system;
   determining a first power time period and creating a first power time curve for power data from the power time series;
   determining a second power time period and creating a second power time curve for power data from the power time series, wherein the first and second power time periods are different;
   comparing power data in the first power time curve for the first power time period with power data in the second power time curve for the second power time period to create a clustering of power data in the compared power time periods;
   generating a dissimilarity matrix from the clustering of power data in the compared power time periods;
   applying a dimensionality reduction algorithm to obtain a low dimensional embedding of the dissimilarity matrix; and
   using the low dimensional embedding of the dissimilarity matrix to perform a density estimation on the clustering of power data in the compared power time periods in order to compute a probability score of power consumption in each of the first power time period and the second power time period being anomalous.

2. The method of claim 1, wherein monitoring at least one power meter electrically connected to the electrical system includes collecting power usage data at specified intervals.

3. The method of claim 1 wherein the first power time period and the at least one additional power time period each cover approximately the same time interval.

4. The method of claim 1 including imputation of any missing values in the first power time period and the second power time period before comparing the first power time period with the second power time period.

5. The method of claim 4 wherein imputation of any missing values includes imputing a value using one of a mean value, a median value, a local weighted average, a global average, a nearest neighbor value, and a weighted average of the two nearest neighbor values.

6. The method of claim 1 further including determining the magnitude of the frequency spectrum for each of the power time periods.

7. The method of claim 6 wherein the magnitude of the frequency spectrum is used in comparing the first power time period with the second power time period to generate the dissimilarity matrix.

8. The method of claim 7 wherein in comparing the first power time period with the second power time period to generate the dissimilarity matrix, the dissimilarity is computed using standard Euclidean distance measure.

9. The method of claim 8 wherein the dissimilarity matrix in comparing the first power time period with the second power time period to generate the dissimilarity matrix is obtained by computing the distance measure for all pairs of sequences.

10. The method of claim 8 further including verifying the dissimilarity matrix is approximately symmetric.

11. The method of claim 1 wherein applying a dimensionality reduction algorithm to obtain embedding of the dissimilarity matrix further includes using Euclidean embedding algorithms selected from the group of multi-dimensional scaling and laplacian algorithms.

12. The method of claim 1 wherein computing a probability score of each of the first power time period and the second power time period being anomalous includes using a density estimation algorithm to determine low density regions.

13. A method of detecting power consumption anomalies in an electrical system comprising:
    determining a power time series from monitoring at least one power meter connected to the electrical system;
    determining a first power time period having a first time interval and collected power data;
    determining additional power time periods having collected power data and having time period differing from the first time period and time intervals similar to the first time interval from the power time series;
    determining any missing power data values in the first power time period and any additional power time periods and imputing any missing power data values;
    determining the magnitude of the frequency spectrum for the power data in the first power time period and the additional power time periods;
    comparing the magnitude of the frequency spectrum for the power data in the first power time period with the magnitude for the power data in the additional power time periods at specified sequence intervals to create a clustering of power data in the compared time periods;
    generating a dissimilarity matrix from the clustering of power data in the compared power time periods;
    applying a dimensionality reduction algorithm to obtain a low dimensional embedding of the dissimilarity matrix; and
    using the low dimensional embedding of the dissimilarity matrix to perform a density estimation on the clustering of power data in the compared time periods in order to compute a probability score of power consumption in the first time period and the additional time periods being anomalous.

14. A non-transitory computer-readable storage medium having machine readable instructions that when executed by a processor cause the processor to:
    determine a power time series from monitoring at least one power meter connected to the electrical system;
    determine a first power time period having a first time interval and collected power data;
    determine a second power time period having a second time interval and collected power data and wherein the first and second time periods are different;
    compare power data of the first power time period with power data of the second power time period to create a clustering of power data in the compared power time periods;
    generate a dissimilarity matrix from the clustering of power data in the compared power time periods;
    apply a dimensionality reduction algorithm to obtain a low dimensional embedding of the dissimilarity matrix in the clustering of power data; and
    using the low dimensional embedding of the dissimilarity matrix to perform a density calculation on the clustering of power data in order to compute a probability score of power consumption in each of the first and second power time periods being anomalous.

* * * * *